Dec. 31, 1940.　　　M. GEIGER　　　2,227,075

SAW-TOOTH CURRENT GENERATOR

Filed Jan. 19, 1939　　　5 Sheets-Sheet 1

INVENTOR
MAX GEIGER
BY *H. S. Grove*
ATTORNEY

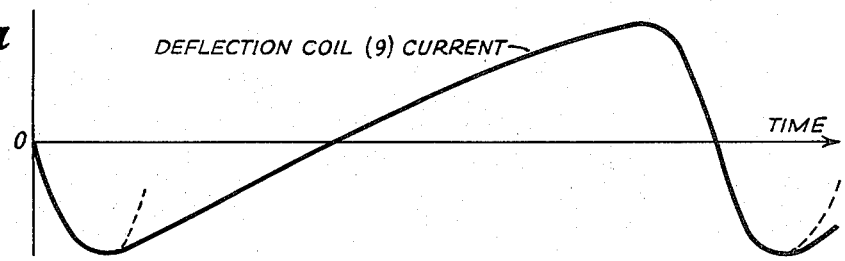
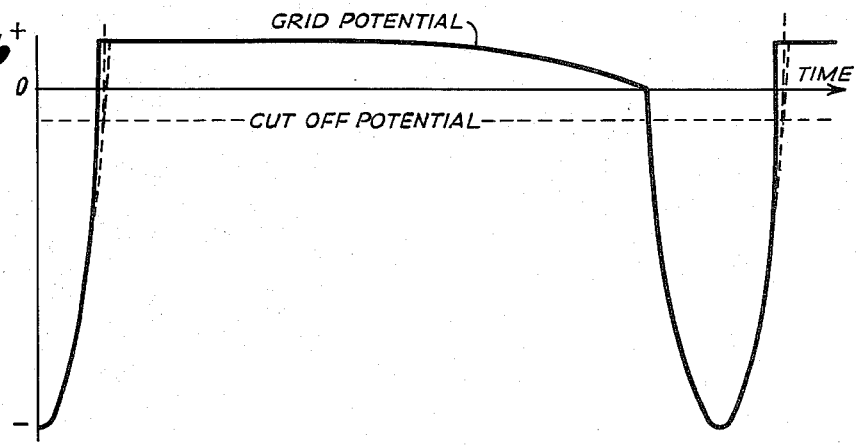
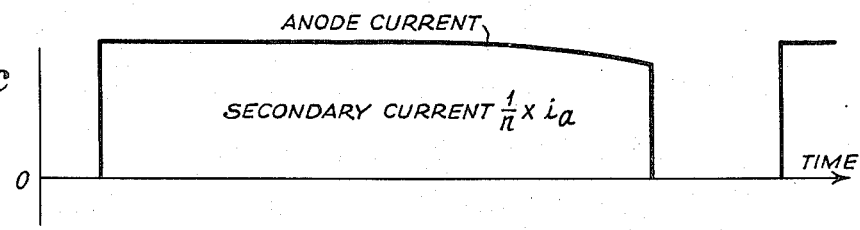
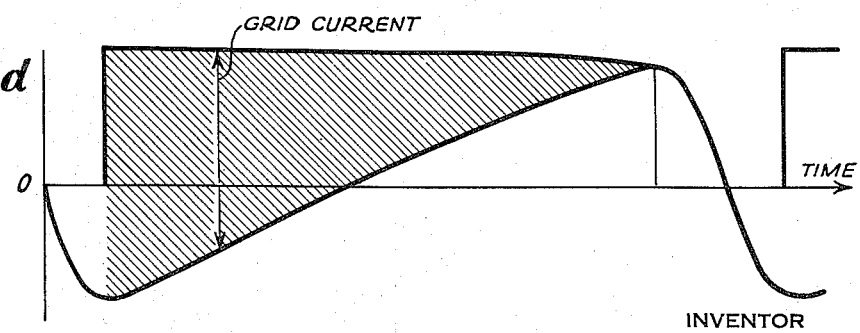

Dec. 31, 1940.    M. GEIGER    2,227,075
SAW-TOOTH CURRENT GENERATOR
Filed Jan. 19, 1939    5 Sheets-Sheet 3

INVENTOR
MAX GEIGER
BY *H. S. Snover*
ATTORNEY

Dec. 31, 1940.                M. GEIGER                2,227,075
                      SAW-TOOTH CURRENT GENERATOR
                    Filed Jan. 19, 1939        5 Sheets-Sheet 4

INVENTOR
MAX GEIGER
BY H.S. Grover
ATTORNEY

Dec. 31, 1940. M. GEIGER 2,227,075
SAW-TOOTH CURRENT GENERATOR
Filed Jan. 19, 1939 5 Sheets-Sheet 5

INVENTOR
MAX GEIGER
BY
ATTORNEY

Patented Dec. 31, 1940

2,227,075

UNITED STATES PATENT OFFICE 2,227,075

SAW-TOOTH CURRENT GENERATOR

Max Geiger, Berlin, Germany, assignor to Telefunken Gesellschaft für Drahtlose Telegraphie m. b. H., Berlin, Germany, a corporation of Germany Application January 19, 1939, Serial No. 251,726
In Germany January 20, 1938

3 Claims. (Cl. 250—36)

In British Patents #456,138, 456,640 and 456,666 are disclosed various forms of construction of time-base or relaxation-wave generators for television use. The disclosure of each comprises an electron tube in an oscillation circuit organization. Inductive or capacitive coupling relation therewith is the coil serving to produce the deflection of cathode-ray beams, a saw-tooth current being produced in the said coil. This self-oscillating generator as known in the prior art inheres several drawbacks, and it is the purpose of the present invention to overcome and cure them.

The advantages of the present invention will become apparent to those skilled in the art from a reading of the following specification and claims, particularly when considered with the drawings, wherein like reference characters represent like parts and wherein:

Figures 2a, 2b, 2c and 2d show curves relating to the operation of a saw-tooth current generator.

Figure 1:
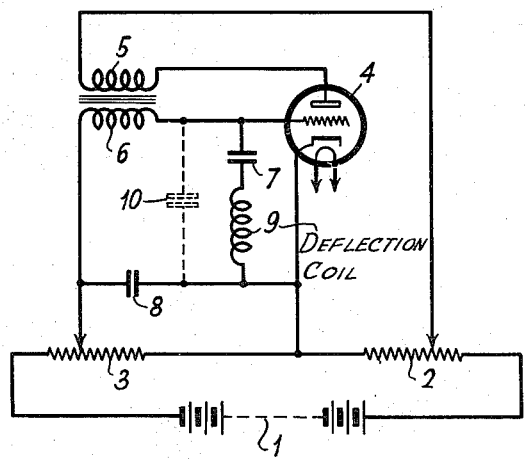
Figure 1 shows a known saw-tooth current generator.

The generator disclosed in British Patent #456,640 is shown again in Figure 1 of the appended drawings, with the modification that in this case the source of potential supply simply consists of a battery, while in the patent disclosure a transformer with rectifier and filter circuit was shown. Now, the said source of potential indicated at 1 is closed by way of two series-connected potentiometer resistances 2 and 3. At 2 is tapped the plate potential for the electron tube 4, while from 3 is derived the biasing voltage for the grid. The common pole of the said two resistances is joined to the cathode of tube 4. Included in the plate circuit is the primary winding 5 of a transformer. The grid circuit comprises the secondary winding 6 of the transformer which, in turn, in series with the constant potential is united with the potentiometer 3. In parallel relation to the winding 6, and coupled by way of the condensers 7 and 8, is the deflector coil 9. The plate of the condenser 8 away from winding 6, which is connected to the one end of the deflector coil 9, is united with the cathode of tube 4.

The operation of the generator shall be examined in stationary oscillating state. For a starting point, the assumption shall be made that the oscillatory circuit comprising the coil 9, transformer (5, 6) and its distributed capacitance 10 (indicated by dash-lines) has been excited. In this examination, the transformer (5, 6) shall be regarded as an ideal transformer; for alternating current it is connected in parallel relation to coil 9, and it acts like a choke-coil of very high inductance. Its ratio of transformation is $1/n$ for the plate current of tube 4. Capacitors 7 and 8 shall be supposed to be so high that in the course of a period no appreciable voltage variations will be able to arise, and that the same will be immaterial so far as the examination of the oscillatory actions are concerned; in fact, all they do is to prevent the flow of direct current through coil 9. Hence, the current flowing in the coil 9 is first in the shape of a free oscillation (shown in Figure 2a oscillating with negative current values). The period of this oscillation is governed by the values of L and C of the oscillatory circuit (9, 10). The grid of tube 4 as a result of preceding oscillation shall be negative; moreover, it is impressed with a negative biasing voltage furnished from potentiometer 3. The shape of the grid voltage is illustrated in Figure 2b. In proportion as the current rise in the coil diminishes in the course of the oscillation, the grid potential becomes less negative. Approximately at the point where the current is reversed in the deflection coil, zero grid potential is reached, and during the next alternation of the oscillation, the grid will be impressed with a positive potential. These actions are illustrated in Figures 2a and 2b by dash-lines. They do not happen exactly like that, for the reason that when the blocking potential of the grid is passed, that is at the potential for which plate current begins to flow, the strong feedback between grid and plate current becomes effective and the grid potential very rapidly is pushed to the highest possible value, that is, until grid current starts to flow. As soon as the grid cathode path is opened, the magnetic energy which has been stored in the inductance of the circuit is discharged. This action is governed by the ratio between inductance and resistance of the circuit (coil 9 and grid path); that is to say, the ratio between L of coil 9 and the sum total of the resistances of coil 9 and the grid path. The values of L, C, and R are suitably so chosen that the free oscillation of the coil occurs with relatively great speed, and the discharge of the magnetic energy across the grid path relatively slowly.

The slow rise of the coil current proceeds in accordance with an exponential curve, in other words, the slope of current rise becomes less, and thus as a result also the grid potential is slowly reduced. This action is intensified by the feedback; and as soon as cathode potential level is reached at the grid, the grid current disappears, and a rapid fall of the grid potential into the negative region is occasioned by the feedback. What happens next is that the energy of the inductance of the circuit is discharged by way of its distributed capacitance 10 in a direction other than before; the current goes through the semi-oscillation before described, and thus the action before described happens again.

To the shape of the grid potential (Figure 2b) corresponds the plate current shown in Figure 2c. This current, basically, has the same form as the current flowing through the secondary winding 6 which is equal to $i_a/n$. When any current at all flows through the tube 4, it is invariably full plate current. Through the grid-cathode path flows first the current $i_a/n$. Moreover, initially the current of the deflector coil 9 flows by way of the grid path. This current initially has a markedly negative value; it grows towards zero at a roughly constant rate. After the zero axis has been passed, the current of the coil flows in the opposite direction; this current is now covered by the current $n.i_a$, with the result that from then on it is only the difference between the secondary current and the roughly linearly rising coil current that will flow by way of the grid-cathode path. In Figure 2d the secondary current and the coil current are plotted together. In other words, what flows by way of the grid is the total volume of current shown shaded in Figure 2d. Assuming that at the beginning of the period the coil current is equal to the current $n.i_a$, there flows in the grid twice the secondary current. Through the cathode, aside from the said grid current, there flows also the plate current. Supposing that the ratio of transformation of transformer (5, 6) is $n=1$, then the cathode, at least at the beginning of the period, will carry a total current equal to three times the plate current. As a general rule, $n$ will be less than unity; hence, the secondary current and thus the incipient coil current will be greater than the plate current so that the above rough consideration becomes still less favorable for the grid.

Figure 3:
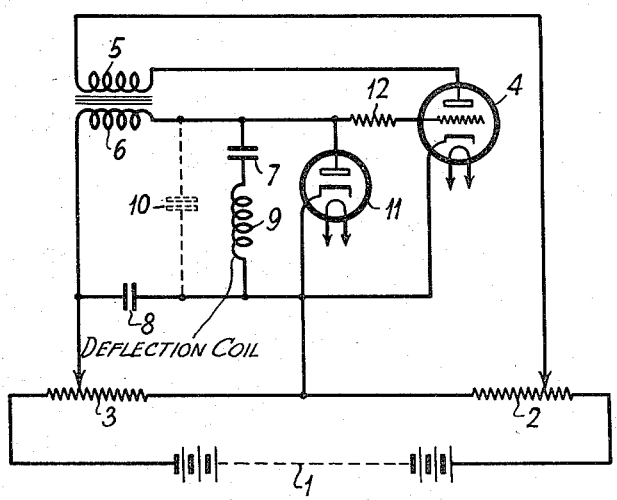
Figures 3, 4, 5, 6, 7 and 9 show various forms of the present invention.
Figure 4:
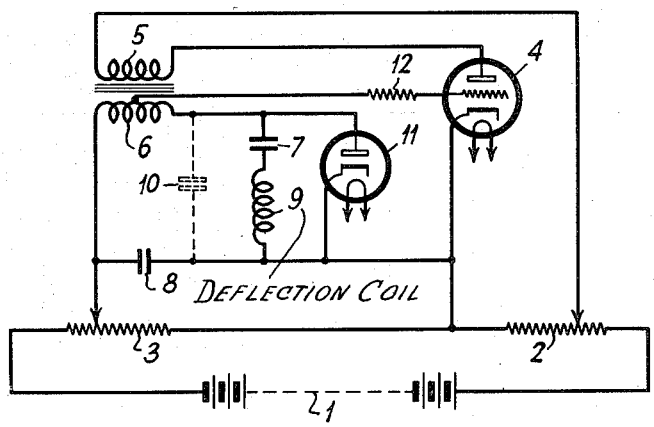
Figure 5:
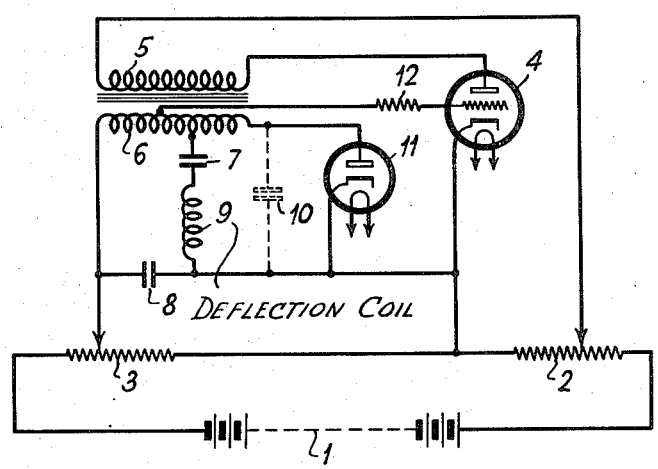

Now it is fundamentally this marked current load that the electron tube 4 is called upon to carry which is the drawback of the generator as described. To carry this scheme into practice, extremely large tubes with powerful plates and special grids capable of high load-carrying capacities are required. The same situation holds true of other generators whose current-voltage characteristics present two branches of dissimilar slope which are separated by a branch of negative slope, one of the positive branches (long flank of sawtooth) is subject to hyper-aperiodic damping, whereas the other positive branch (short flank) is subject to hypo-aperiodic damping. Now, in order that generators of this kind may be operated with conventional types of electron tubes, the suggestion is here made to relieve the grid-cathode path of part of its load by the paralleling of a diode 11 having a low inner resistance. Optionally, a resistance as indicated at 12 may be included between the anode of the diode and the grid of tube 4 (see Figure 3). The result is that the grid current before referred to has a chance to flow off through the diode, while the cathode of tube 4 is called upon to carry only the plate current properly so-called. To be sure, the marked negative voltage peaks, which may be of an order of magnitude as high as 10,000 volts, will still reach the grid. Such a voltage load is unusual for standard tubes, for the reason that it endangers the grid-cathode insulation to a marked degree. In order to obviate this difficulty, recourse is had according to the invention to a circuit organization as shown in Figure 4. In this scheme the full potential which is available for the control of the grid is divided. This, as shown by way of example in Figure 4, is accomplished by tapping the control potential from only part of winding 6. Moreover, according to another object of the invention, the deflection coil 9 is not paralleled to the full feedback potential. Inasmuch as the feedback in the exemplified embodiment here described is effected by the intermediary of a transformer, the deflection coil is in parallel relation to part of the secondary winding 6 as shown in Figure 5. It will thus admit of a higher current load. What may also be mentioned is that the source of voltage supply realized by the potentiometer 3 could be substituted, as fundamentally well known in the art, by the paralleling of a capacity and a resistance with an adequately high time-constant.

Figure 6:
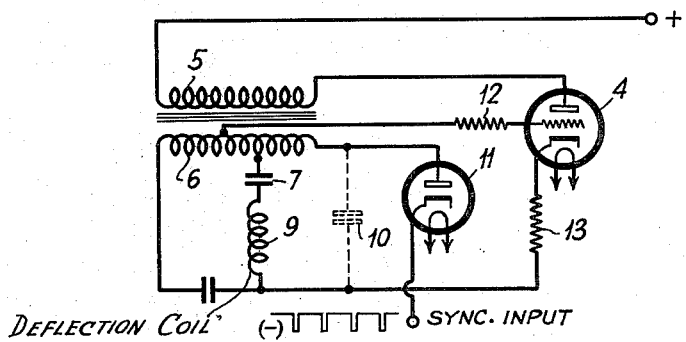
Figure 7:
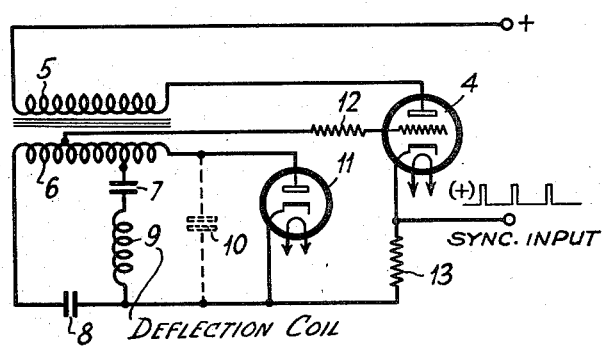

For the purpose of synchronizing the generator disclosed in Figure 1 the suggestion was made in the British patents referred to above to act upon the electron tube 4 by impulses imparted to another grid (say, screen grid) of tube 4; or else to provide on the transformer (5, 6) a third winding by way of which the grid or plate circuit may be acted on. There was no chance directly to synchronize the generator in the grid for the reason that a resistance in series with the inductance of the grid circuit results in damping, with the requisite time-constants being unfavorably affected. However, the diode provided according to the invention insures a convenient chance to insure synchronization. If, as shown in Figure 6, a resistance 13 is interposed between the cathode of the diode and tube 4, it will be feasible to influence the generator by negative impulses at the cathode of the diode without the time-constant of the oscillatory circuit being altered by this resistance. Analagous, the synchronizing resistance 13 could be connected also ahead of the cathode of tube 4, the generator being synchronized by means of positive impulses at this cathode (Figure 7).

Figure 8:
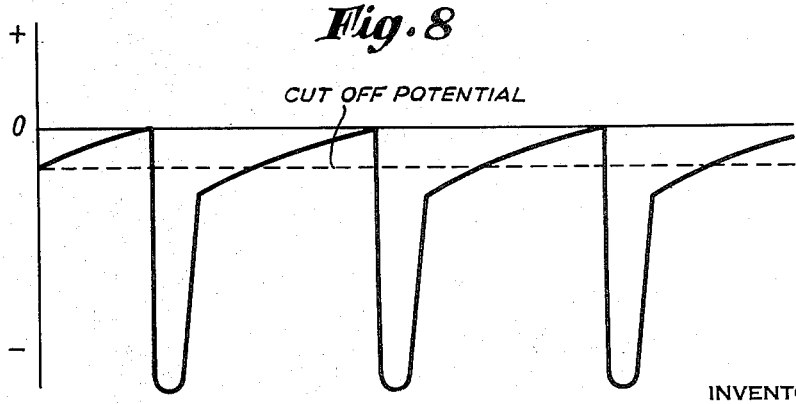
Figure 8 shows a curve of operation of a saw-tooth current generator.
Figure 9:
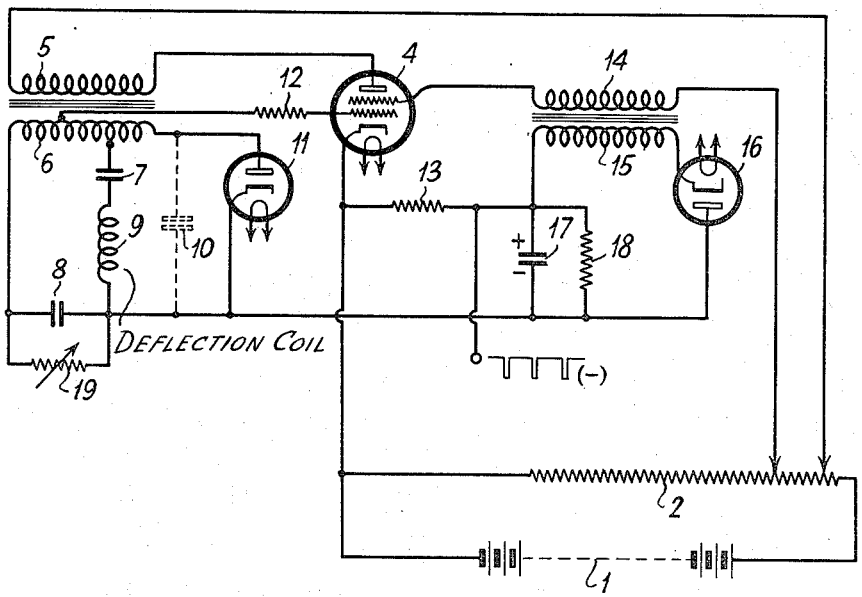

In all cases hereinbefore disclosed, the potential acting at the grid of tube 4, qualitatively, exhibits a form as in Figure 2b, while the form of a plate current is that of Figure 2c. Thus, the full plate current flows always in tube 4. However, what follows from Figure 2d is that a plate current and thus a secondary current will be able to be initiated only when the coil current passes through the zero axis. The plate current need not start at the full value, it may have sawtooth form; but what is always necessary is that a positive difference should exist between it and the coil current as indicated by the shaded portion in Figure 2d. Inasmuch as such form means a considerable saving of current, it is here suggested to control the electron current in such a way that its plate current temporarily has sawtooth form, and that it is initiated only shortly prior to the second half of the period. The voltage at the control grid must then have a form as shown in Figure 8. Moreover, this control action by feedback is to be derived from the generator itself. An exemplified embodiment in which this object of the invention is incorporated is shown in Figure 9 and shall be further described by reference thereto.

If the electron tube 4 has a screen grid in addition to the control grid, then, as the control grid is pushed to the negative potential, not only the plate current, but also the screen-grid current will be cut off. If in series with the screen grid is connected the primary winding 14 (Figure 9) of a transformer, then, as the current is abruptly cut off, a voltage will be induced in the secondary winding 15 of the transformer. The secondary winding constituted a closed circuit with a rectifier 16 and a capacity 17 to which a resistance 18 is connected in parallel. The rectifier has a polarity such that the voltage induced by the cut-off will at once cause the flow of a current through the diode. Thus the condenser 17 is charged in the way as stated. It discharges slowly across resistance 18 until it is again charged up by another shock. Hence, what arises at the condenser 17 is a saw-tooth voltage. If this condenser is cut in between the cathodes of tube 4 and diode 11, the control grid of tube 4 will be impressed with the potential shown in Figure 8. The synchronizing resistance 13 lies between the cathode of tube 4 and the positively charged pole of the condenser 17, if the generator is to be synchronized by negative impulses (as shown), or else directly ahead of the cathode of tube 4 when synchronization is to take place with positive impulses. In the circuit organization Figure 9, in lieu of the constant grid biasing voltage at the potentiometer 3, the parallel connection of a capacity 8 and a resistance 19 with an adequately high time-constant is shown.

I claim:

1. A system for producing current variations of saw-tooth wave form comprising a discharge tube having a cathode, a control electrode and an anode, a transformer having a pair of mutually inductive windings, means including one of said windings for maintaining the anode positive with respect to the cathode, means including a resistance for connecting one end of the other winding to the control electrode of said discharge tube, means including a condenser for connecting the other end of said other winding to the cathode of said discharge tube, means for maintaining said control electrode negative with respect to said cathode, a second discharge tube including a cathode and an anode, means for connecting the cathode of said second discharge tube to the cathode of said first discharge tube, means for connecting the anode of said second discharge tube to said one end of the other winding, and a series connected inductor and capacitor connected in parallel with said second discharge tube.

2. A circuit for producing current variations of saw-tooth wave form including a transformer having a pair of mutually inductive windings, a discharge tube having a cathode and an anode, means for connecting one end of one of said windings to the anode of said discharge tube, means including a condenser for connecting the other end of said one winding to the cathode of said discharge tube, a second discharge tube including a cathode, a control electrode and an anode, means including the other of said windings for maintaining said anode positive with respect to said cathode, means for connecting the cathode of said second discharge tube to the cathode of said first discharge tube, means including a resistance for connecting the control electrode of said second discharge tube to said first winding, means for maintaining said control electrode negative with respect to said cathode, and a series connected inductor and capacitor connected in parallel with said first discharge tube.

3. A circuit for producing current variations of saw-tooth wave form including a transformer having a pair of mutually inductive windings, an electron tube having a cathode and an anode, means for connecting one end of one of said windings to the anode of said electron tube, means including a condenser for connecting the other end of said one winding to the cathode of said electron tube, a second electron discharge tube including a cathode, a control electrode and an anode, means including the other of said windings for maintaining the anode positive with respect to the cathode of said second electron tube, means for connecting the cathode of said second electron tube to the cathode of said first electron tube, means including a resistance for connecting the control electrode of said second electron tube to said first winding, means for maintaining said control electrode negative with respect to its associated cathode, and a series connected inductor and capacitor connected between the cathode of said first electron tube and said one winding.

MAX GEIGER.